(12) United States Patent
Wilkinson et al.

(10) Patent No.: US 12,211,262 B2
(45) Date of Patent: Jan. 28, 2025

(54) YARN QUALITY CONTROL

(71) Applicant: INV PERFORMANCE MATERIALS, LLC, Wilmington, DE (US)

(72) Inventors: Caleb Roland Wilkinson, Wilmington, DE (US); Chelsea Mae Sidlo Wallace, Wilmington, DE (US); Jenna Ott, Kingston (CA); David Samuel Dempster, Kingston (CA)

(73) Assignee: INV PERFORMANCE MATERIALS, LLC

( * ) Notice: Subject to any disclaimer, the term of this patent is extended or adjusted under 35 U.S.C. 154(b) by 468 days.

(21) Appl. No.: 17/439,426

(22) PCT Filed: Mar. 13, 2020

(86) PCT No.: PCT/IB2020/052332
§ 371 (c)(1),
(2) Date: Sep. 15, 2021

(87) PCT Pub. No.: WO2020/188452
PCT Pub. Date: Sep. 24, 2020

(65) Prior Publication Data
US 2022/0254005 A1    Aug. 11, 2022

Related U.S. Application Data

(60) Provisional application No. 62/819,122, filed on Mar. 15, 2019.

(51) Int. Cl.
*G06V 10/00* (2022.01)
*G06N 3/045* (2023.01)
(Continued)

(52) U.S. Cl.
CPC ........... *G06V 10/993* (2022.01); *G06N 3/045* (2023.01); *G06N 3/088* (2013.01); *G06T 7/0004* (2013.01);
(Continued)

(58) Field of Classification Search
CPC .... G06V 10/993; G06V 10/82; G06V 10/774; G06V 30/19147; G06N 3/045;
(Continued)

(56) References Cited

U.S. PATENT DOCUMENTS 9,347,889 B2    5/2016  Kousalik et al.
11,562,480 B2 * 1/2023  Hyatt ................... G06T 7/0004
(Continued)

FOREIGN PATENT DOCUMENTS

CN    104532423 B    12/2016
CN    108038846 A     5/2018
(Continued)

OTHER PUBLICATIONS

Ming ("Color fabric defect identification with GAN and FasterR-CNN", Dec. 2018 (Dec. 2018), XP055698517, Retrieved from the Internet: URL:http://journal.xpu.edu.cn/Upload/PaperUpLoad/26b6245f-2a5b-482f-911c-8c4d67d330d1.pdf) (Year: 2018).*
(Continued)

Primary Examiner — Ping Y Hsieh

(57) ABSTRACT

A textile package production system includes an imager, a transporter, a sorter, and a controller. The imager is configured to generate an optical image for a textile package. The imager has at least one optical detector and an optical emitter. The imager has an inspection region. The transporter has a test subject carrier configured for relative movement as to the carrier and the inspection region. The sorter is coupled to the transporter and is configured to make a selection as to a first classification and a second classification. The con-
(Continued)

troller has a processor and a memory. The controller is coupled to the imager, the transporter, and the sorter. The controller is configured to implement an artificial engine classifier in which the sorter is controlled based on the optical image and based on instructions and training data in the memory.

20 Claims, 13 Drawing Sheets

(51) Int. Cl.
    *G06N 3/088*     (2023.01)
    *G06T 7/00*     (2017.01)
    *G06V 10/82*     (2022.01)
    *G06V 10/98*     (2022.01)

(52) U.S. Cl.
    CPC .... *G06V 10/82* (2022.01); *G06T 2207/20081* (2013.01); *G06T 2207/20084* (2013.01)

(58) Field of Classification Search
    CPC .................. G06N 3/088; G06T 7/0004; G06T 2207/20081; G06T 2207/20084; G06F 18/214
    See application file for complete search history.

(56) References Cited

U.S. PATENT DOCUMENTS

| | | | |
|---|---|---|---|
| 2018/0243800 A1 | | 8/2018 | Kumar |
| 2019/0096135 A1* | | 3/2019 | Dal Mutto ........ G06F 18/24765 |

FOREIGN PATENT DOCUMENTS

| | | |
|---|---|---|
| CN | 109003267 A | 12/2018 |
| EP | 1574607 B1 | 10/2010 |
| EP | 2475978 A1 | 7/2012 |
| EP | 2644553 B1 | 4/2016 |
| WO | 0240383 A2 | 5/2002 |
| WO | 2018193343 A1 | 10/2018 |
| WO | 2020188452 A1 | 9/2020 |

OTHER PUBLICATIONS

Antoniou et al. "Data Augmentation Generative Adversarial Networks ", Mar. 21, 2018, 14 pages.

Huang et al. "Study on Machine Learning Based Intelligent Defect Detection System", Matec Web of Conferences, vol. 201, 2018, 10 pages.

International Preliminary Report on Patentability received for PCT Application PCT/IB2020/052332, mailed on Sep. 30, 2021, 11 pages.

International Search Report and Written Opinion received for PCT Application No. PCT/IB2020/052332 , mailed on Jul. 29, 2020, 15 pages.

Jing et al., "Automatic fabric defect detection using a deep convolutional neural network" Coloration Technology, vol. 135, No. Mar. 3, 2014, 2019, 3 pages., Abstract only.

Li et al., "Yarn-dyed fabric defect detection based on GAN and Faster R-CNN", Dec. 2018, Retrieved from the Internet: URL:http://journal.xpu.edu.cn/Upload/PaperUpLoad/26b6245f-2a5b-482f-911c-8c4d67d330d1.pdf, vol. 32., No. 6, Retrieved on Oct. 26, 2021, 7 pages.

Mei et al."Automatic Fabric Defect Detection with a Multi-Scale Convolutional Denoising Autoencoder Network Model", Sensors, vol. 18, No. 4, Apr. 2, 2018, 5 pages., Abstract only.

Weninger et al., "Defect Detection in Plain Weave Fabrics by Yarn Tracking and Fully Convolutional Networks", Retrieved on Oct. 26, 2021, 6 pages.

* cited by examiner

YARN QUALITY CONTROL

CLAIM OF PRIORITY

This patent application is a national stage entry of international Application No. PCT/IB2020/052332 filed on Mar. 13, 2020, which claims the benefit of priority of U.S. Provisional Patent Application Ser. No. 62/819,122, filed on Mar. 15, 2019, both of which is are hereby incorporated by reference herein in their entireties.

TECHNICAL FIELD

This document pertains generally, but not by way of limitation, to textile manufacturing.

BACKGROUND

Filaments are used for manufacturing textile products. An example of one filament production method includes an intermediate step of preparing a yarn package. A yarn package, according to one example, includes a collection of continuous filament wrapped on a form. The shape of the form, the configuration of the windings, and the arrangement of layers are selected for different materials and according to the different production processes.

The filament collections can be referred to as a fiber or a yarn. Yarn can be natural (such as cotton) or synthetic (such as nylon) and include one or more filaments. The yarn can be spun or twisted. An example of a synthetic yarn is polyester which is a thermoplastic polymer that contain the ester functional group in their main chain. Examples include polyethylene terephthalate (PET) or polyethylene succinate (PES). Polypropylene (PP) is another example of a thermoplastic polymer used in a wide variety of applications including carpet manufacturing. Polyamide, also known as nylon, is another example of a synthetic polymer. In addition, polybutylene terephthalate (PBT) includes thermoplastic polyesters. The filament can include a glass fiber, also known as spun glass. Aromatic polyamide are fibers, in which the chain molecules are highly oriented along the fiber axis, so the strength of the chemical bond can be exploited. Also, technical yarns can be used for technical textile products, manufactured for non-aesthetic purposes, where function (rigidity, strength, dimension stability, design flexibility and economic viability) is the primary criterion.

Variations in manufacturing process and production procedures can lead to imperfections in the finished product. Manual inspection methods have been used in the past however they are costly and inefficient.

International application number PCT/US01/45122 (Publication Number WO 02/40383A2) is entitled Method and Apparatus for the Automated Inspection of Yarn Packages and refers to a filament inspection method. Other examples of optical inspection systems for observing properties (dimensions, physical appearance, etc.) of running threads, moving sheet materials, etc., including correction of imperfections with the aid of computer-controlled feedback are mentioned in U.S. Pat. No. 9,347,889B2, EP1574607B1, CN104532423B, WO2018193343A1, EP2644553B1, EP2475978A1.

SUMMARY

The present inventors have recognized, among other things, that a problem to be solved can include overcoming excessive costs associated with inspecting yarn packages while improving efficiency. The present subject matter can help provide a solution to this problem, such as by implementing an image-based classification system configured to recognize package imperfections. One example includes an automated system utilizing artificial intelligence configured to provide an output that controls package sorting equipment or an output that adjusts a parameter of a yarn manufacturing process.

An example of a textile package production system includes an imager, a transporter, a sorter, and a controller. The imager is configured to generate an optical image for a textile package. The imager has at least one optical detector and an optical emitter. The imager has an inspection region. A transporter has a test subject carrier configured for relative movement as to the carrier and the inspection region. The sorter is coupled to the transporter and is configured to select as to a first classification and a second classification. A controller has a processor and a memory. The controller is coupled to the imager, the transporter, and the sorter. The controller is configured to implement an artificial engine classifier in which the sorter is controlled based on the optical image and based on instructions and training data in the memory.

In some examples, a method is implemented at one or more computing machines. The method includes accessing, using a server, a plurality of camera-generated images of wound fiber bobbins that are stored in one or more data storage units, the plurality of camera-generated images comprising a first plurality of images that are labeled as imperfection-free bobbins and a second plurality of images that are labeled as defective bobbins, at least one of the images in the second subset being labeled with a imperfection type. The method includes generating, using a generative adversarial network (GAN) and based on the plurality of camera-generated images, a plurality of computer-generated images of wound fiber bobbins having imperfections, one or more of the computer-generated images being labeled with the imperfection type. The method includes further training, using a transfer learning engine and using a training dataset comprising the plurality of camera-generated images and the plurality of computer-generated images, a previously-trained image recognition deep neural network (DNN) model to identify whether a received image depicts a imperfection and the imperfection type upon detecting a imperfection, wherein, prior to the further training using the transfer learning engine, the model was previously trained to recognize images that are different from wound fiber bobbins. The method includes providing an output representing the model.

Some examples include a machine-readable medium storing instructions to perform the above method. Some examples include a system comprising processing circuitry and memory, the memory storing instructions to perform the above method.

Each of these non-limiting examples can stand on its own or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
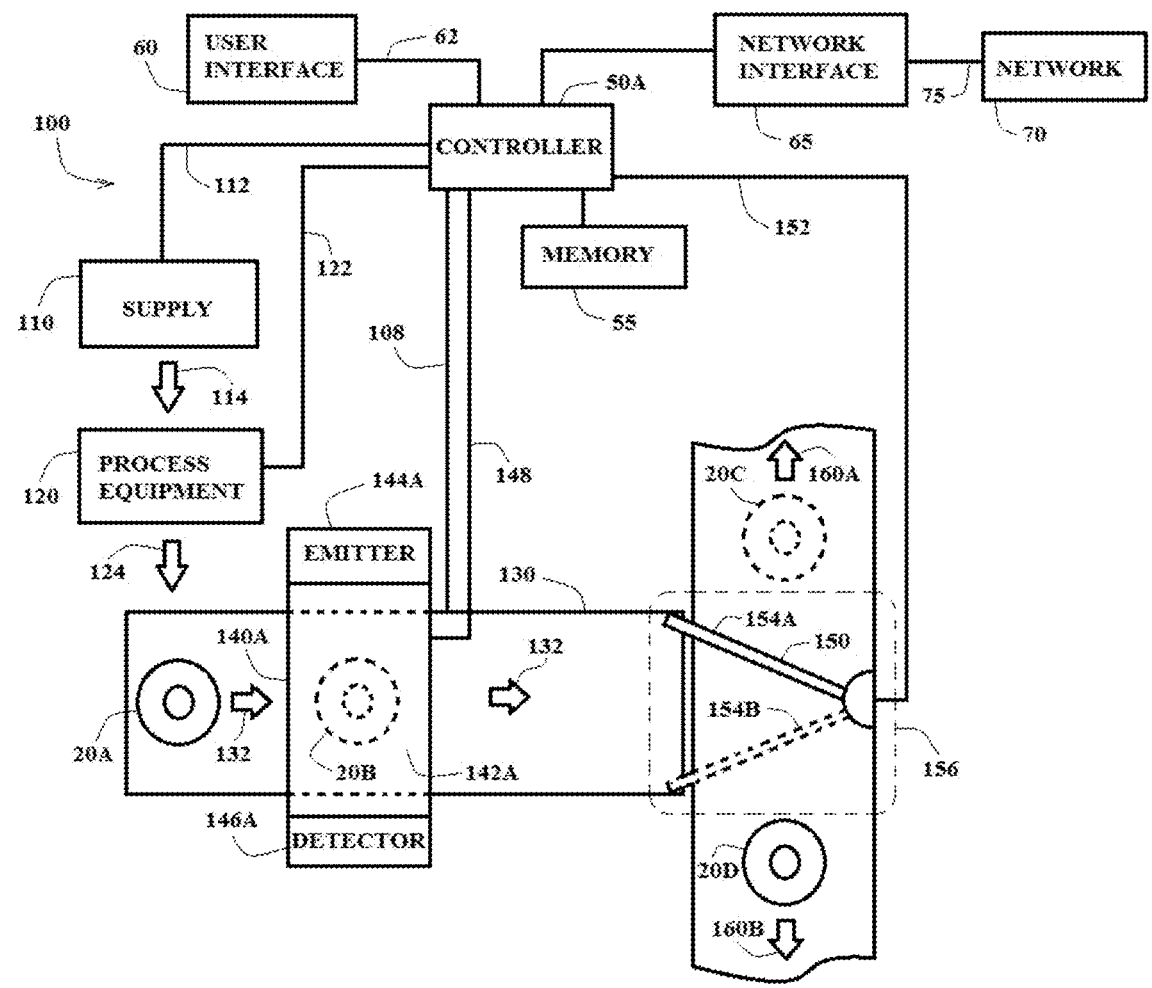
FIG. 1 illustrates an example of a system, according to one example.

FIG. 1 illustrates an example of system 100, according to one example. System 100 includes supply 110. Supply 110 can include a manufacturing plant or a shipping facility in which a supply of filaments is provided. Filaments in a shipping facility can be in various stages of production and are transported, as shown at 114, to process equipment 120. Process equipment 120 can include a variety of equipment, including a precision winder, a twister, cleaning equipment, heating equipment, optical treatment equipment, and tensioning equipment. The output of process equipment 120, in this example, is a filament wound in a form sometimes referred to as a yarn package. A yarn package can include a bobbin.

FIG. 1 illustrates yarn package 20A having moved from process equipment 120 along a path denoted by arrow 124. Package 20A is positioned on conveyer 130 and is configured to travel into imager 140A as denoted by arrow 132. Imager 140A has an interior region 142A in which optical elements, here denoted as emitter 144A and detector 146A, are directed. Emitter 144A can include a light emitter. Detector 146A can include an optical camera. Package 20B is rendered in dotted lines to indicate placement within region 142A or imager 140A. Conveyer 130 carries the package, such as package 20B, from imager 140A to sorter 156. Sorter 156 includes deflector 150 configured to rotate about a pivot and direct packages to a first path or a second path. In the view shown by solid lines, deflector 150 is in position 154A, in a manner to direct the package to discharge in the direction shown by arrow 160B and as indicated by package 20D. In the view shown by dashed lines, deflector 150 is in position 154B, in a manner to direct the package to discharge in the direction shown by arrow 160A and as indicated by package 20C.

In the example shown, system 100 includes controller 50A. Controller 50A is coupled to supply 110 by line 112, to process equipment 120, by line 122, to conveyer 130 by line 108, to imager 140A by line 148, and to sorter 156 by line 152.

Lines 112, 122, 108, and 152 can be bidirectional or unidirectional control channels on which a signal is carried in a wired or wireless protocol.

Controller 50A can be an analog or digital processor and in one example, includes a processor. Controller 50A is coupled to memory 55, and is coupled to user interface 60 by link 62. User interface 60 can include a keyboard, a mouse, touchpad, display, printer, or other device. Link 62 can be wired or wireless. Controller 50A is coupled to network interface 65 which, in turn, is also coupled to network 70. Network 70 can be an internet, an intranet, a cloud, or other data or communication channel In one example, controller 50A implements an artificial intelligence algorithm. The artificial intelligence algorithm accesses training data and access data from imager 140A to evaluate optically discernable parameters to classify packages. For example, upon receiving parameter data on link 148, controller 50A can use artificial intelligence to control downstream processing of a package. In the example shown in the figure, controller 50A has set deflector 150 in a position to route package 20B in the direction of path 160B. Path 160B can correspond to a detected imperfection.

In response to data from imager 140A, or in response to other input information derived from, by way of examples, conveyor 130, sorter 156, process equipment 120, supply 110, user interface 60, or network interface 65, controller 50A can also provide control signals to modulate production processes by way of adjusting a parameter associated with supply 110 or process equipment 120.

Figure 2:
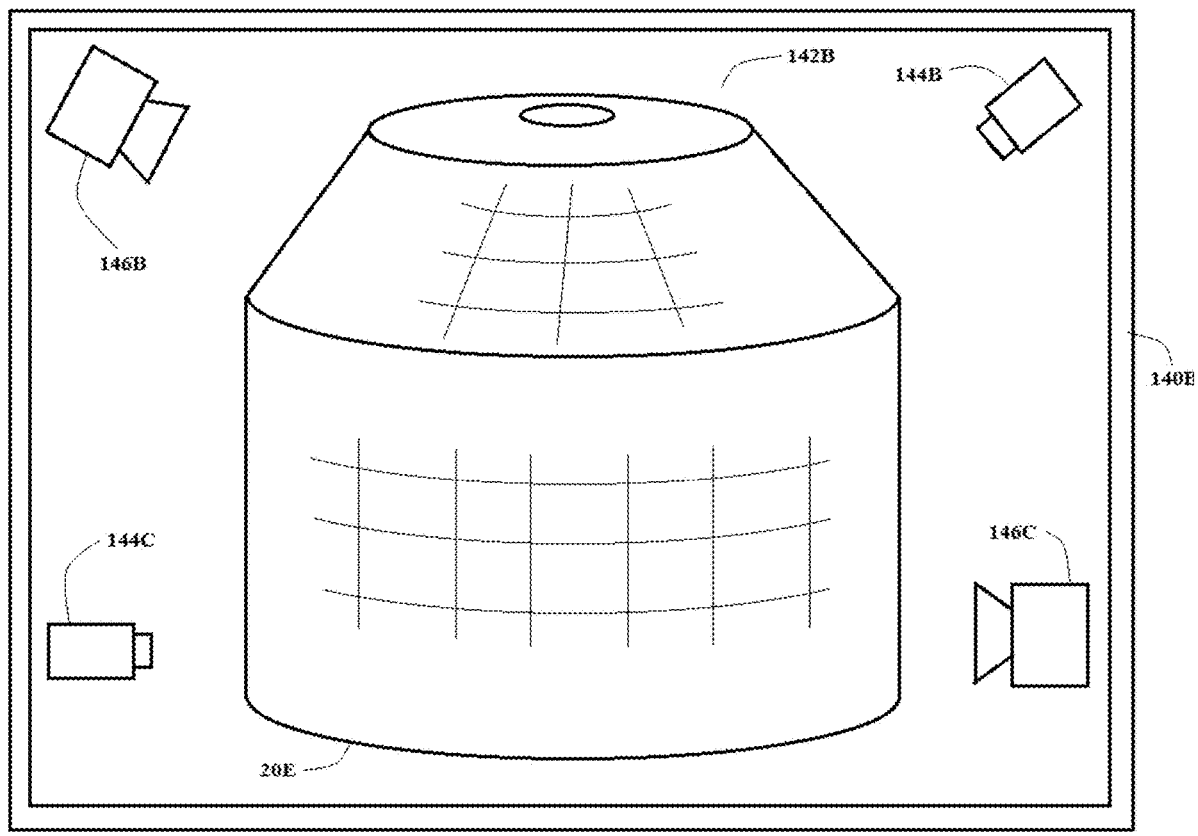
FIG. 2 illustrates an example of an imager, according to one example.

FIG. 2 illustrates an example of imager 140B, according to one example. Imager 140B is shown having yarn package 20E within region 142B. Region 142B is bounded in this example by a housing configured to control lighting conditions therein. In the example shown, light emitters 144B and 144C are configured to provide light having characteristics to facilitate meaningful detection of imperfections by optical detectors, here denoted as cameras 146B and 146C. Light emitters 144B and 144C can include a ring light or a bar light.

In one example, emitters 144B and 144C and cameras 146B and 146C are each coupled to a controller, such as controller 50A. For example, controller 50A can be configured to control a camera. Camera control can include selecting a camera position, selecting a camera view angle, selecting a depth of field, selecting a lens, selecting a camera parameter such as shutter speed, aperture, or another parameter. Emitter control can includes selecting a light position, selecting a direction of illumination, selecting a filter, or selecting a light parameter such as temperature, spectrum, intensity or another parameter.

Figure 3:
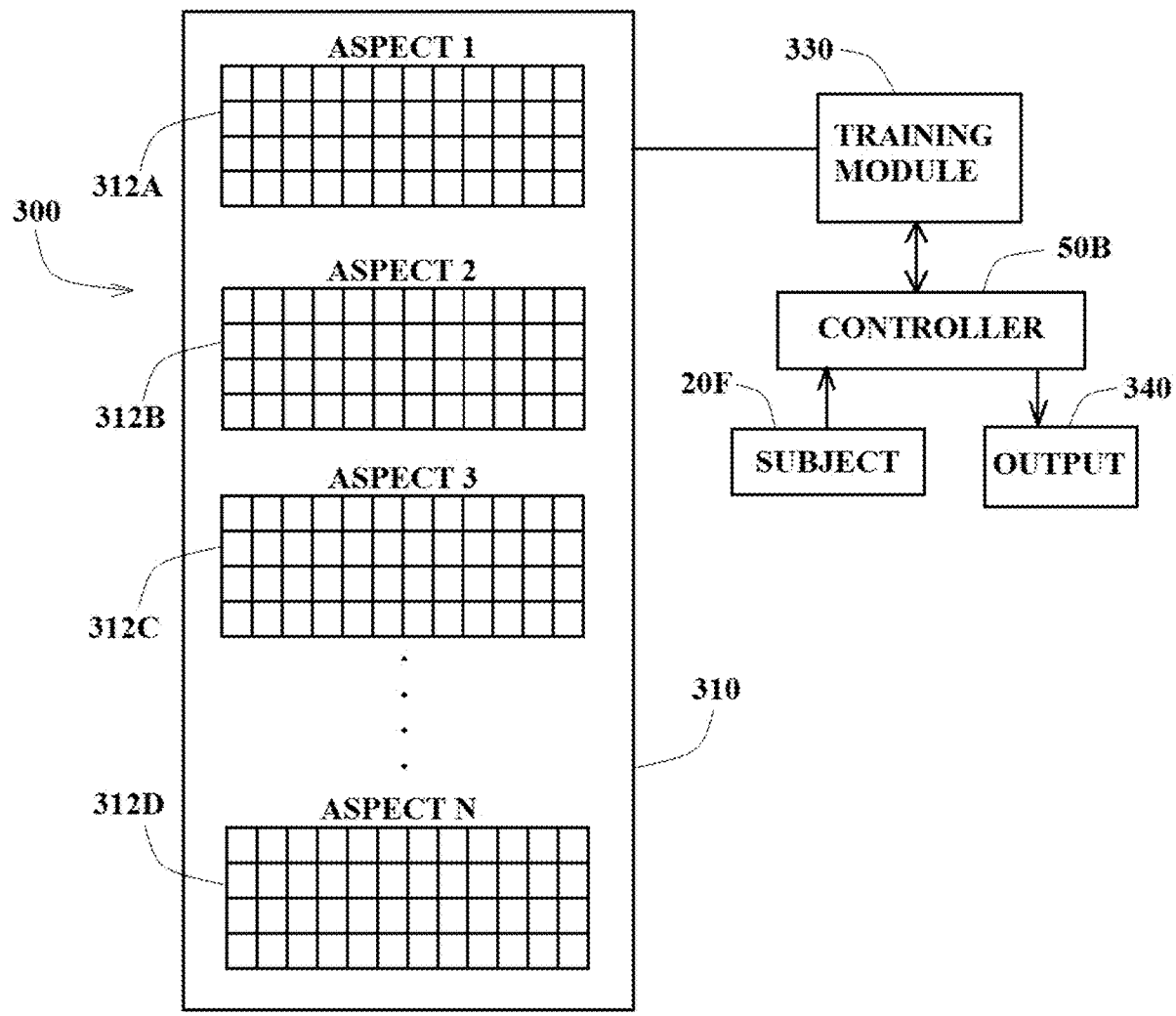
FIG. 3 illustrates an example of a method, according to one example.

FIG. 3 illustrates an example of method 300, according to one example. Method 300 depicts training of an artificial intelligence system. Training data 310, in the form of a plurality of annotated images can be provided to training module. Annotated images can be prepared by subject matter experts. In this example, the training data is grouped to facilitate training on aspect 1 using data 312A, on aspect 2 using data 312B, on aspect 3 using data 312C and on aspect N using data 312D. For example, aspect 1 can represent a thread break condition and training data 312A can include large number of images depicting examples of thread breaks. Similarly, training data 312B can correspond to a imperfection such as stitches on cone or overthrow. The images in the training set can include a rich assortment of views and examples.

Training module 330 represents a training routine in which controller 50B is configured to assess subject 20F. Module 330 can include filter parameters and tensor parameters that evolve with continued training and evolve with continued assessment of subjects. Controller 50B, when assessing an image corresponding to subject 20F (here, representing a yarn package), based on data provided by imager 140A, executes an artificial intelligence algorithm to classify subject 20F. Classification results are provided as shown at output 340. Output 340 can include a notification signal, an alarm, setting a flag, sending a message, or adjusting a manufacturing parameter (such as supply 110 or process equipment 120).

Figure 4:
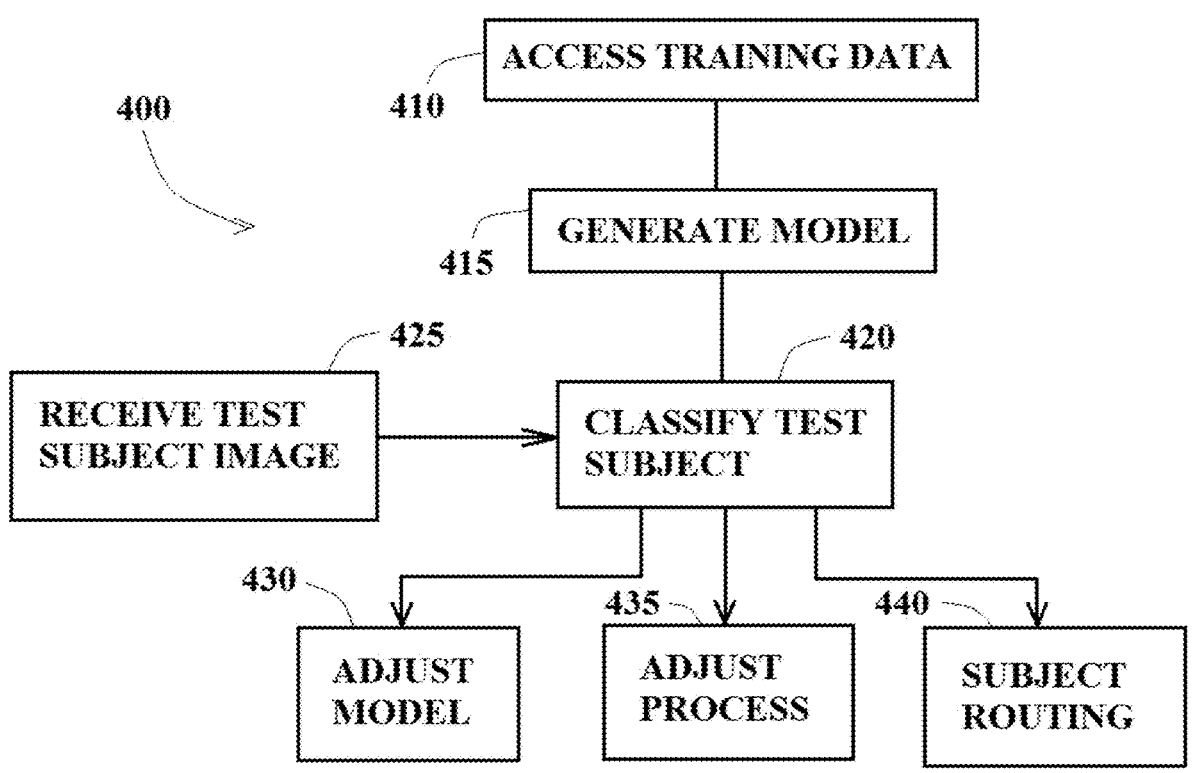
FIG. 4 illustrates an example of a method, according to one example.

FIG. 4 illustrates an example of method 400, according to one example. Method 400 includes, at 410, accessing training data. The training data can include image data and can be grouped according to different types of imperfections. At 415, method 400 includes generating a model. The model can be defined by setting values for array dimensions, by setting filter parameters, by setting sampling rates, or by other such parameters.

After sufficient training using the training data and model generation, method 400 includes, at 425, receiving one or more images for a test subject. The test subject images can be provided by an imager, such as imager 140A. The test subject image data can be classified by controller 50A using artificial intelligence, at 420. Controller 50A can implement any of several different artificial intelligence classifier algorithms. One example includes a convolution neural network analysis. One example is known by the name YOLO (you only look once). Several of the different varieties of YOLO are suitable for implementation in the present subject matter.

After classification at 420, processing can continue as denoted by adjust model (at 430), adjust process (at 435), and further routing of subject (at 440). Model adjusting, such as at 430, can include adjusting parameters (such as filter coefficients) that correspond to specific imperfections. Process adjustment, such as at 435, can include adjusting yarn speed in a process equipment, adjusting winding parameter such as yarn tension, adjusting temperature, or adjusting other parameters. Subject routing can be controlled, at 440, by way of mechanical structures which can alter the path of a conveyed package.

Figure 5:
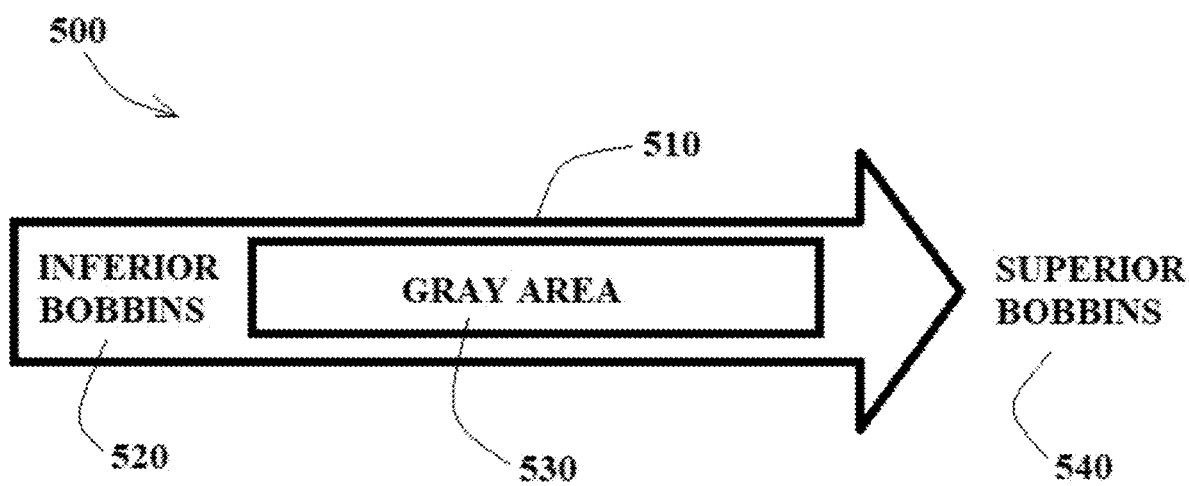
FIG. 5 illustrates an example of a construct, according to one example.

FIG. 5 illustrates an example of construct 500, according to one example. Construct 500 depicts spectrum of progress in the form of arrow 510. At 520, inferior bobbins having been imaged and processed, are shown at a low end of the spectrum. At 540, superior bobbins, having been imaged and processed, are shown at a high end of the spectrum. The inferior bobbins can include the worst examples and the superior bobbins can be perfect examples. One approach includes narrowing the gray area, at 530.

Figure 6:
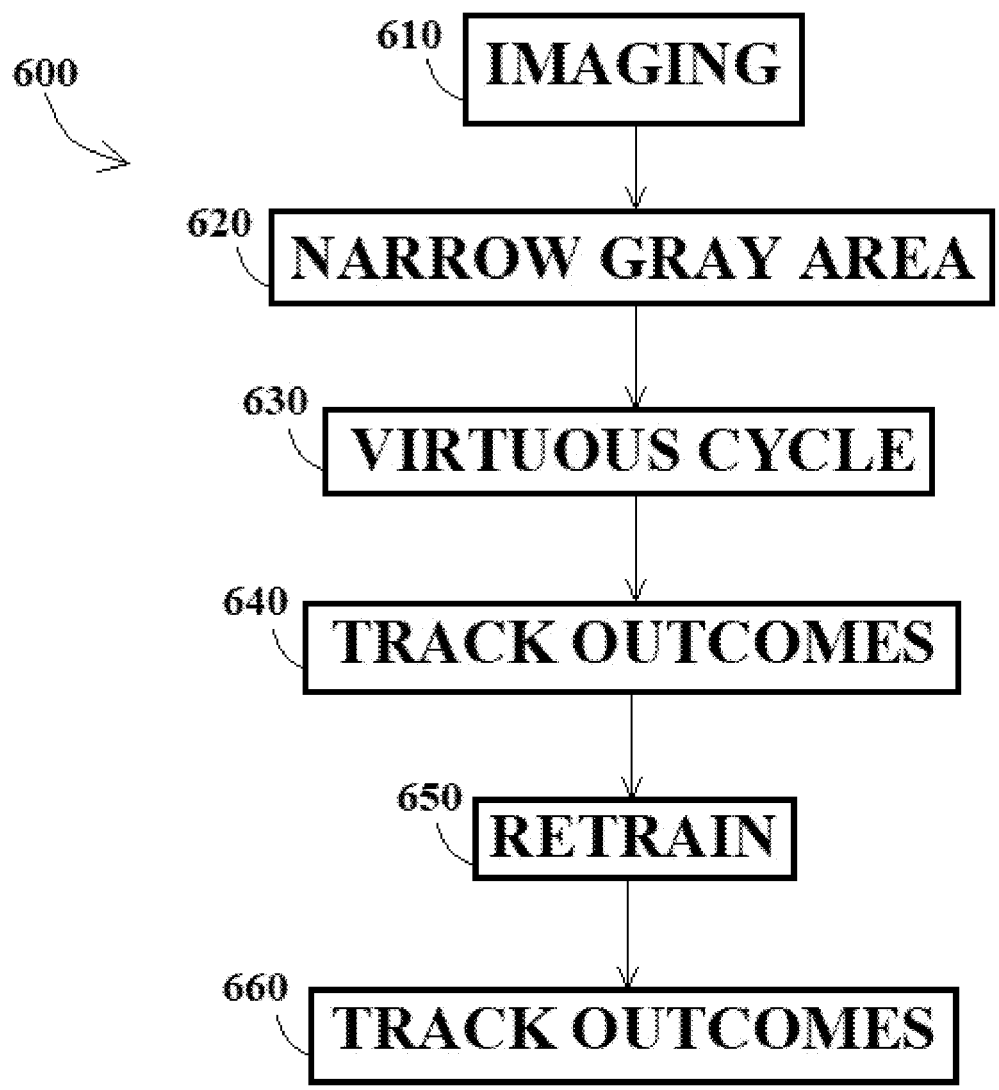
FIG. 6 illustrates an example of a method, according to one example.

FIG. 6 illustrates an example of method 600, according to one example. Method 600 can be interpreted in conjunction with construct 500 to illustrate a procedure for training a machine language algorithm. At 610, method 600 includes imaging a set of perfect (or superior) bobbins and imaging a set of worst (or inferior) bobbins. This includes imaging examples of each imperfection. At 620, method 600 includes imaging additional bobbins in a manner to narrow or reduce the scope of gray area 530. For example, better quality bobbins exhibiting each imperfection can be imaged. In this manner, 620 includes working toward perfect bobbins in a manner that narrows gray area 530.

At 630, method 600 includes engaging in a virtuous cycle of machine learning wherein a user (such as an inspector) classifies the bobbins as they are being imaged. For example, the bobbins on a production line will be imaged in a camera and imaging system, as described herein, and a human operator can augment the data, on a per-bobbin basis, with noted conditions. After having imaged a series of annotated bobbins, the training set of data can be stored for future use.

At 640, method 600 includes tracking outcomes. This can include monitoring system output to ensure classification and decisions are consistent and do not deviate. In one example, this can include an audit system in which known bobbins are re-imaged and compared with expected outcomes. At 650, the algorithm can be re-trained using saved images in the event that deviation in classification is observed.

At 660, method 600 includes tracking outcomes over continued use of the audit system. Tracking outcomes can include monitoring trends and changes in values over a period of time such as days, weeks, months, quarters, or years. In one example of the present subject matter, a package formation trend may be discerned over a period of time. A trend may be predictable using an AI engine of the present subject matter.

In one example, the output from an imager is configured to provide high dynamic range imaging (HDR). High-dynamic-range imaging is a high dynamic range (HDR) technique used in imaging to reproduce a greater dynamic range of luminosity than what is possible with standard digital imaging or photographic techniques. Certain techniques allow differentiation only within a certain range of brightness. Outside of this range, no features are visible because there is no differentiation in bright areas as everything appears just pure white, and there is no differentiation in darker areas as everything appears pure black.

A HDR image, on the other hand, can record and represent a greater range of luminance levels than can be achieved using more traditional methods. An HDR image can be generated by capturing and then combining several different, narrower range, exposures of the same subject matter.

An HDR image can include computer renderings and images resulting from merging multiple low-dynamic-range (LDR) or standard-dynamic-range (SDR) photographs. HDR images can also be acquired using special image sensors, such as an oversampled binary image sensor.

In one example, the extended luminosity range of input HDR images is compressed to be made visible. The method of rendering an HDR image to a standard monitor or printing device can include tone mapping. Tone mapping reduces the overall contrast of an HDR image to facilitate display on devices or printouts with lower dynamic range, and can be applied to produce images with preserved local contrast (or exaggerated for artistic effect). In one example, an HDR image is generated using three standard resolution images.

In various examples, an imaging filter is provided to achieve selected representative images. For example, an image can be selected to capture (or attenuate) optical content in the range of green light, yellow light, or brown light. In one example, filtering can include using polarized light and imaging using polarizing filters. A stain or feature, for example, may correlate with a contaminant, such as grease or dirt, on a filament. A color imager (or camera) can be utilized to distinguish between types of stains. In one example, the stain may be associated with a imperfection noted in the bobbin core.

In one example, a system includes a prioritized scheme of analysis. The analysis can include, in order, a vision system, followed by a computer vision system, followed by a machine learning vision system. In the event that the computer vision is unable to discern the condition, the machine learning vision takes over.

In one example, a combination of imaging technologies are deployed to provide shadow-free lighting suitable for detecting small, low contrast imperfections.

Machine Learning Embodiments

As discussed above, variations in manufacturing process and production procedures for wound fiber bobbins can lead to imperfections in the finished product. Manual inspection methods have been used in the past however they are costly and inefficient. Automating the inspection methods using artificial intelligence and/or machine learning techniques may be desirable. Some aspects of the technology disclosed herein are directed to automating the inspection methods for wound fiber bobbins using artificial intelligence and/or machine learning techniques.

In some embodiments, a server generates and trains an image recognition deep neural network (DNN) model to identify whether a received image of a wound fiber bobbin depicts a imperfection and the imperfection type upon detecting a imperfection. That model is provided (e.g., transmitted over a network) to an edge device. The edge device then deploys the model to identify defective bobbins. The edge device may be one or more of a desktop computer, a laptop computer, a tablet computer, a mobile phone, a digital music player, and a personal digital assistant (PDA).

As used herein, the term "identification" (or "identify") encompasses its plain and ordinary meaning Among other things, the term "identification" may refer to an artificial neural network (ANN) identifying an image as belonging to a specified class (e.g., "non-defective bobbin," "bobbin having imperfection type A," "bobbin having imperfection type B," and the like). The image may then be labeled with the identification. For example, a bounding box may be placed around a bobbin and the label "imperfection type A" may be placed on the bounding box. The label may correspond to an identification of the thing depicted in the bounding box. In the inference phase, the label is generated by the ANN. In the training phase of a supervised learning engine, human-generated labels (or labels generated by another machine learning engine) are provided to the untrained or partially-trained ANN in order for the ANN to train itself to generate labels, as described herein, for example, in conjunction with FIGS. 1-4.

A supervised image classification network training system uses a dataset of images. This dataset includes pairs, where each pair includes an image and its associated label. This label acts as an identifier of the specimen (such as a bobbin) to whom the image belongs. During the inference phase, an authentication system receives only an image (typically called a probe image) and its task is to predict the associated label. In order to do so, the authentication system makes use of the trained classification network. The classification network then provides the identifier/label along with its the information on how certain it is about the identifier. The certainty is typically expressed using probability.

Aspects of the systems and methods described herein may be implemented as part of a computer system. The computer system may be one physical machine, or may be distributed among multiple physical machines, such as by role or function, or by process thread in the case of a cloud computing distributed model. In various embodiments, aspects of the systems and methods described herein may be configured to run on desktop computers, embedded devices, mobile phones, physical server machines and in virtual machines that in turn are executed on one or more physical machines. It will be understood that features of the systems and methods described herein may be realized by a variety of different suitable machine implementations.

The system includes various engines, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality. However, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

As used herein, the term "convolutional neural network" or "CNN" may refer, among other things, to a neural network that is comprised of one or more convolutional layers (often with a subsampling operation) and then followed by one or more fully connected layers as in a standard multilayer neural network. In some cases, the architecture of a CNN is designed to take advantage of the 2D structure of an input image. This is achieved with local connections and tied weights followed by some form of pooling which results in translation invariant features. In some cases, CNNs are easier to train and have many fewer parameters than fully connected networks with the same number of hidden units. In some embodiments, a CNN includes multiple hidden layers and, therefore, may be referred to as a deep neural network (DNN). CNNs are generally described in "ImageNet Classification with Deep Convolutional Neural Networks," part of "Advances in Neural Information Processing Systems 25" (NIPS 2012) by Alex Krizhevsky, Ilya Sutskever, and Geoffrey E. Hinton, available at: papers.nips.cc/paper/4824-imagenet-classification-with-deep-convolutional-neural-network, last visited 28 Aug. 2019, the entire content of which is incorporated herein by reference.

As used herein, the phrase "computing machine" encompasses its plain and ordinary meaning. A computing machine may include, among other things, a single machine with a processor and a memory or multiple machines that have access to one or more processors or one or more memories, sequentially or in parallel. A server may be a computing machine. A client device may be a computing machine. An edge device may be a computing machine. A data repository may be a computing machine.

Throughout this document, some method(s) (e.g., in FIG. 13) are described as being implemented serially and in a given order. However, unless explicitly stated otherwise, the operations of the method(s) may be performed in any order. In some cases, two or more operations of the method(s) may be performed in parallel using any known parallel processing techniques. In some cases, some of the operation(s) may be skipped and/or replaced with other operations. Furthermore, skilled persons in the relevant art may recognize other operation(s) that may be performed in conjunction with the operation(s) of the method(s) disclosed herein.

Figure 7:
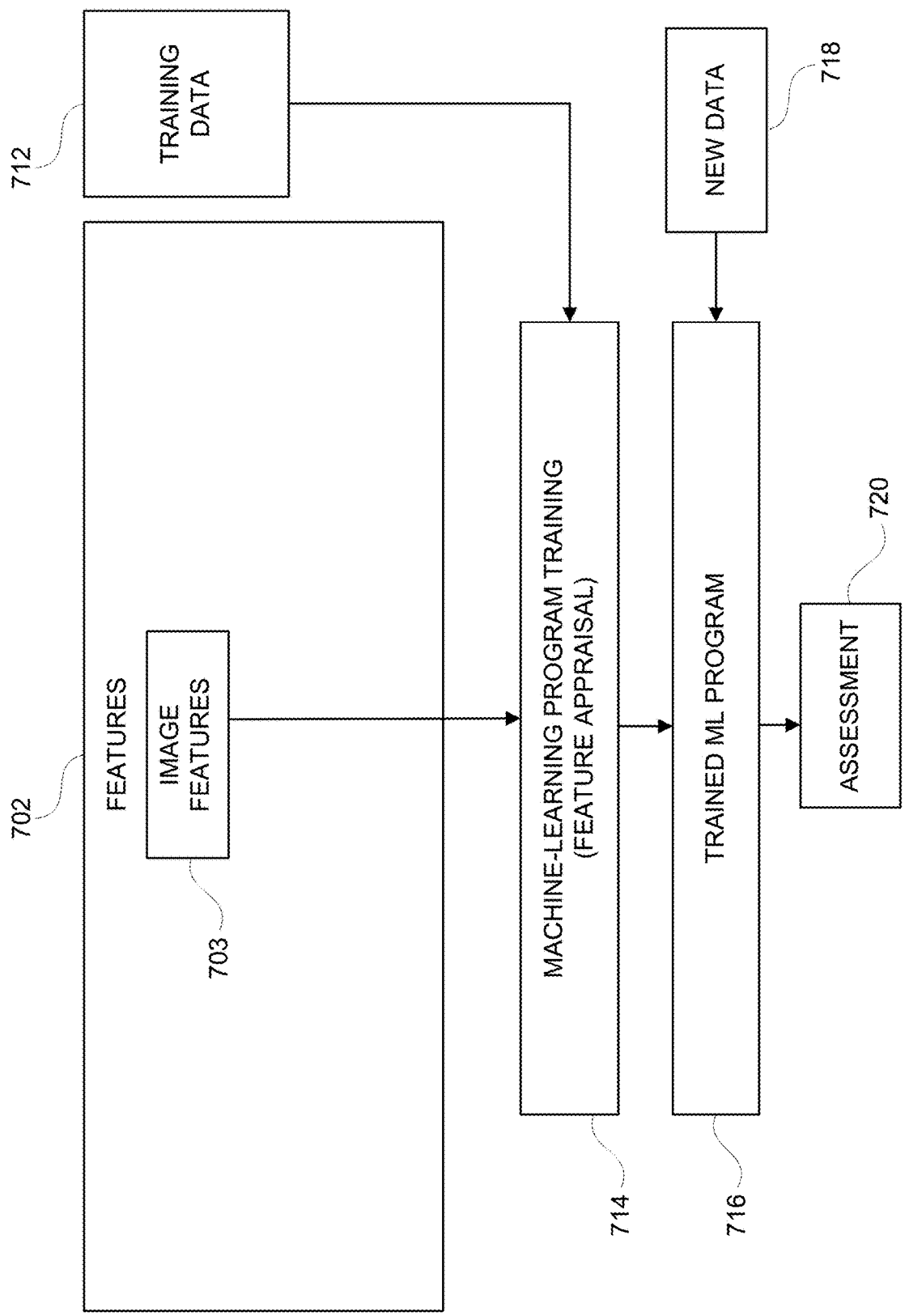
FIG. 7 illustrates the training and use of a machine-learning program, in accordance with some embodiments.

FIG. 7 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning (ML) is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 712 in order to make data-driven predictions or decisions expressed as outputs or assessments 720. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying images of bobbins.

Two common types of problems in machine learning are classification problems and regression problems. Classification problems, also referred to as categorization problems, aim at classifying items into one of several category values (for example, is this object an apple or an orange, or does the image depict a bobbin having a circularity imperfection or a stain). Regression algorithms aim at quantifying some items (for example, by providing a value that is a real number). The machine-learning algorithms utilize the training data 712 to find correlations among identified features 702 that affect the outcome.

The machine-learning algorithms utilize features 702 for analyzing the data to generate assessments 720. A feature 702 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 702 may be of different types and may include various image features 703 that are detectable by a machine accessing an input image. The image features 703 may include texture(s), color(s), shape(s), edge(s), and the like.

The machine-learning algorithms utilize the training data 712 to find correlations among the identified features 702 that affect the outcome or assessment 720. In some example embodiments, the training data 712 includes labeled data, which is known data for one or more identified features 702 and one or more outcomes, such as detecting imperfection(s) or lack of imperfections in bobbin(s).

With the training data 712 and the identified features 702, the machine-learning tool is trained at operation 714. The machine-learning tool appraises the value of the features 702 as they correlate to the training data 712. The result of the training is the trained machine-learning program 716.

When the machine-learning program 716 is used to perform an assessment, new data 718 is provided as an input to the trained machine-learning program 716, and the machine-learning program 716 generates the assessment 720 as output. For example, when a bobbin image is checked for imperfection(s), the machine-learning program utilizes the image features to determine if there are imperfection(s) in the bobbin.

Machine learning techniques train models to accurately make predictions on data fed into the models (e.g., whether a bobbin depicted in an image has imperfection(s)). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs and is evaluated over several epochs to more reliably provide the output that is specified as corresponding to the given input for the greatest number of inputs for the training dataset. In another example, for an unsupervised learning phase, a model is developed to cluster the dataset into n groups and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs (or outputs indicating whether there are bobbin imperfection(s) for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

Figure 8:
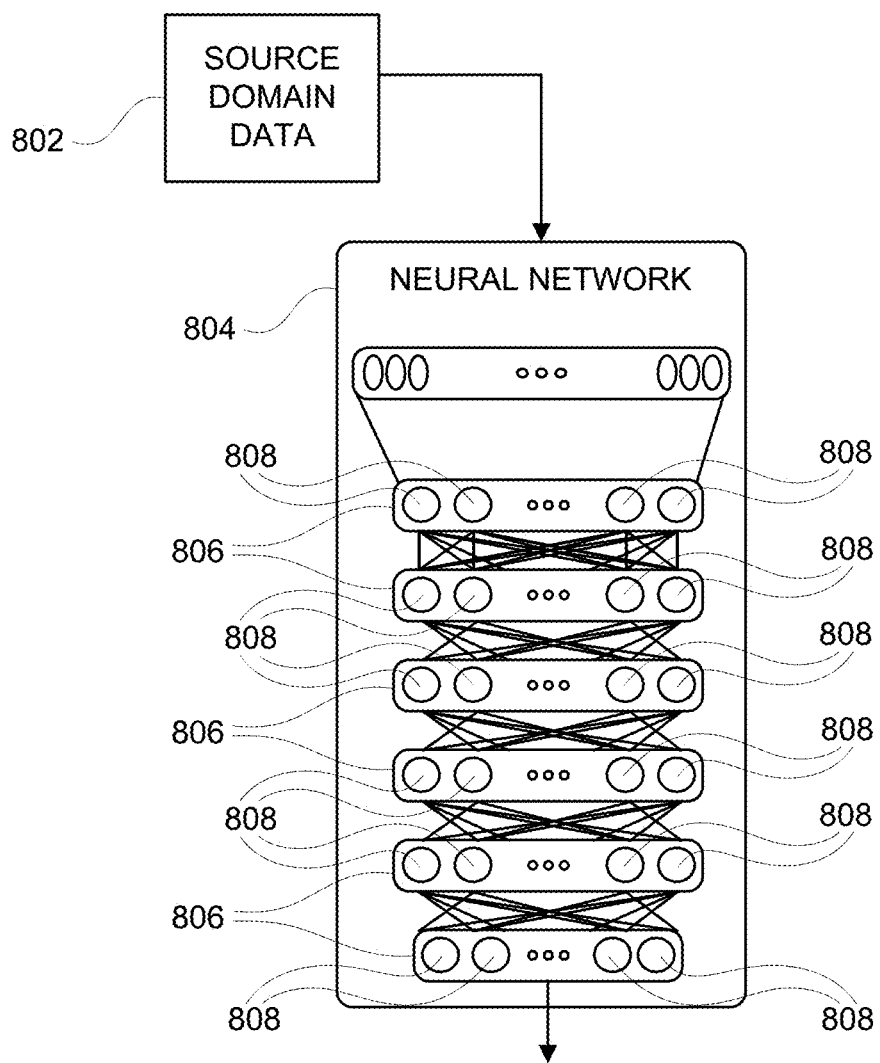
FIG. 8 illustrates an example neural network, in accordance with some embodiments.
Figure 8:
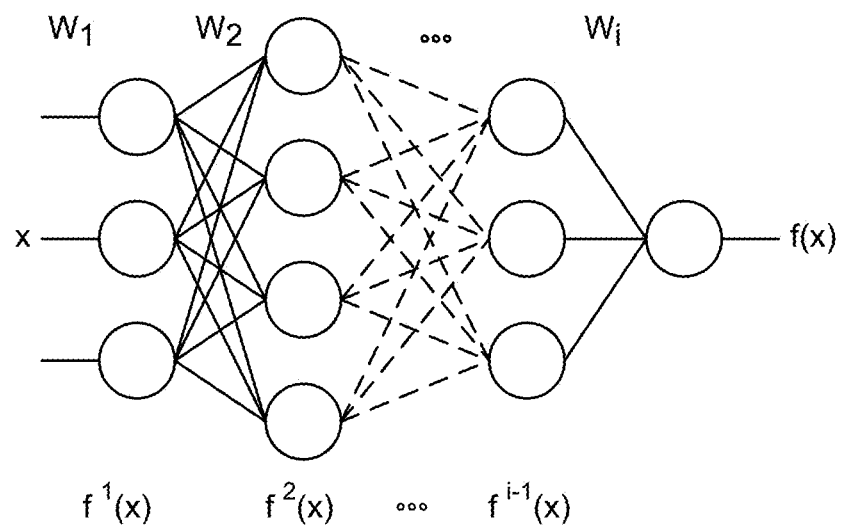

FIG. 8 illustrates an example neural network 804, in accordance with some embodiments. As shown, the neural network 804 receives, as input, source domain data 802. The input is passed through a plurality of layers 806 to arrive at an output. Each layer 806 includes multiple neurons 808. The neurons 808 receive input from neurons of a previous layer and apply weights to the values received from those neurons in order to generate a neuron output. The neuron outputs from the final layer 806 are combined to generate the output of the neural network 804.

As illustrated at the bottom of FIG. 8, the input is a vector x. The input is passed through multiple layers 806, where weights $W1, W2, \ldots, Wi$ are applied to the input to each layer to arrive at $f1(x), f2(x), \ldots, fi-1(x)$, until finally the output $f(x)$ is computed. The weights are established (or adjusted) through learning and training of the network. As shown, each of the weights $W1, W2, \ldots, Wi$ is a vector. However, in some embodiments, one or more of the weights may be a scalar.

Neural networks utilize features for analyzing the data to generate assessments (e.g., recognize imperfection(s) in bobbin(s)). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of neural networks of biological brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images. A neural network is based on a collection of connected units called neurons, where each connection, called a synapse, between neurons can transmit a unidirectional signal with an activating strength (e.g., a weight as shown in FIG. 8) that varies with the strength of the connection. The weight applied for the output of a first neuron at the input of a second neuron may correspond to the activating strength. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the biological brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 9:
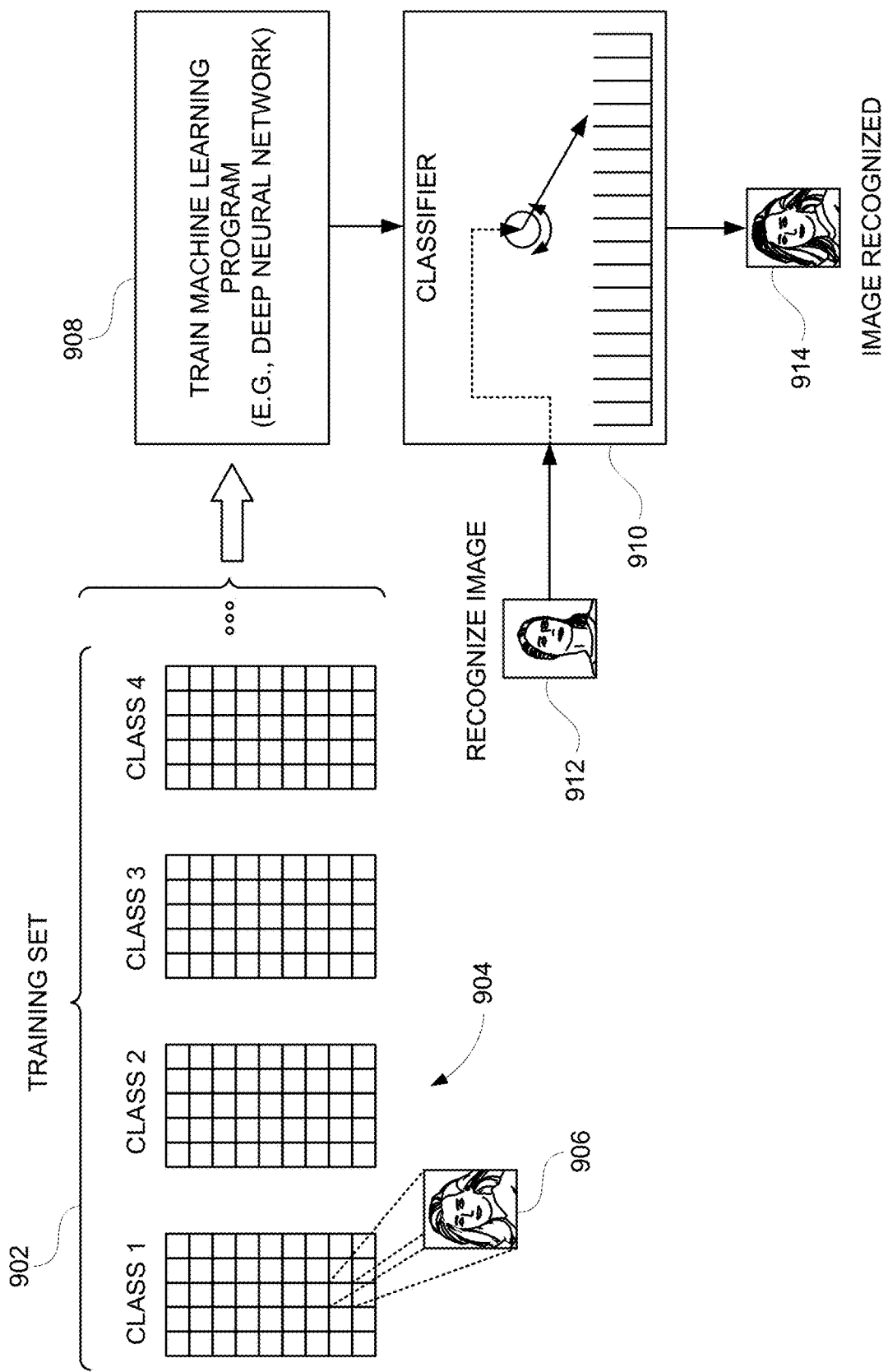
FIG. 9 illustrates the training of an image recognition machine learning program, in accordance with some embodiments.

FIG. 9 illustrates the training of an image recognition machine learning program, in accordance with some embodiments. The machine learning program may be implemented at one or more computing machines. Block 902 illustrates a training set, which includes multiple classes 904. Each class 904 includes multiple images 906 associated with the class. Each class 904 may correspond to a type of object in the image 906 (e.g., a digit 0-9, a man or a woman, a cat or a dog, a bobbin lacking imperfections or having a specified imperfection type, etc.). In one example, the machine learning program is trained to recognize images of the presidents of the United States, and each class corresponds to each president (e.g., one class corresponds to Barack Obama, one class corresponds to George W. Bush, one class corresponds to Bill Clinton, etc.). At block 908 the machine learning program is trained, for example, using a deep neural network. At block 910, the trained classifier, generated by the training of block 908, recognizes an image 912, and at block 914 the image is recognized. For example, if the image 912 is a photograph of Bill Clinton, the classifier recognizes the image as corresponding to Bill Clinton at block 914.

FIG. 9 illustrates the training of a classifier, according to some example embodiments. A machine learning algorithm is designed for recognizing faces, and a training set 902 includes data that maps a sample to a class 904 (e.g., a class includes all the images of purses). The classes may also be referred to as labels. Although embodiments presented herein are presented with reference to object recognition, the same principles may be applied to train machine-learning programs used for recognizing any type of items.

The training set 902 includes a plurality of images 906 for each class 904 (e.g., image 906), and each image is associated with one of the categories to be recognized (e.g., a class). The machine learning program is trained 908 with the training data to generate a classifier 910 operable to recognize images. In some example embodiments, the machine learning program is a DNN.

When an input image 912 is to be recognized, the classifier 910 analyzes the input image 912 to identify the class (e.g., class 914) corresponding to the input image 912.

Figure 10:
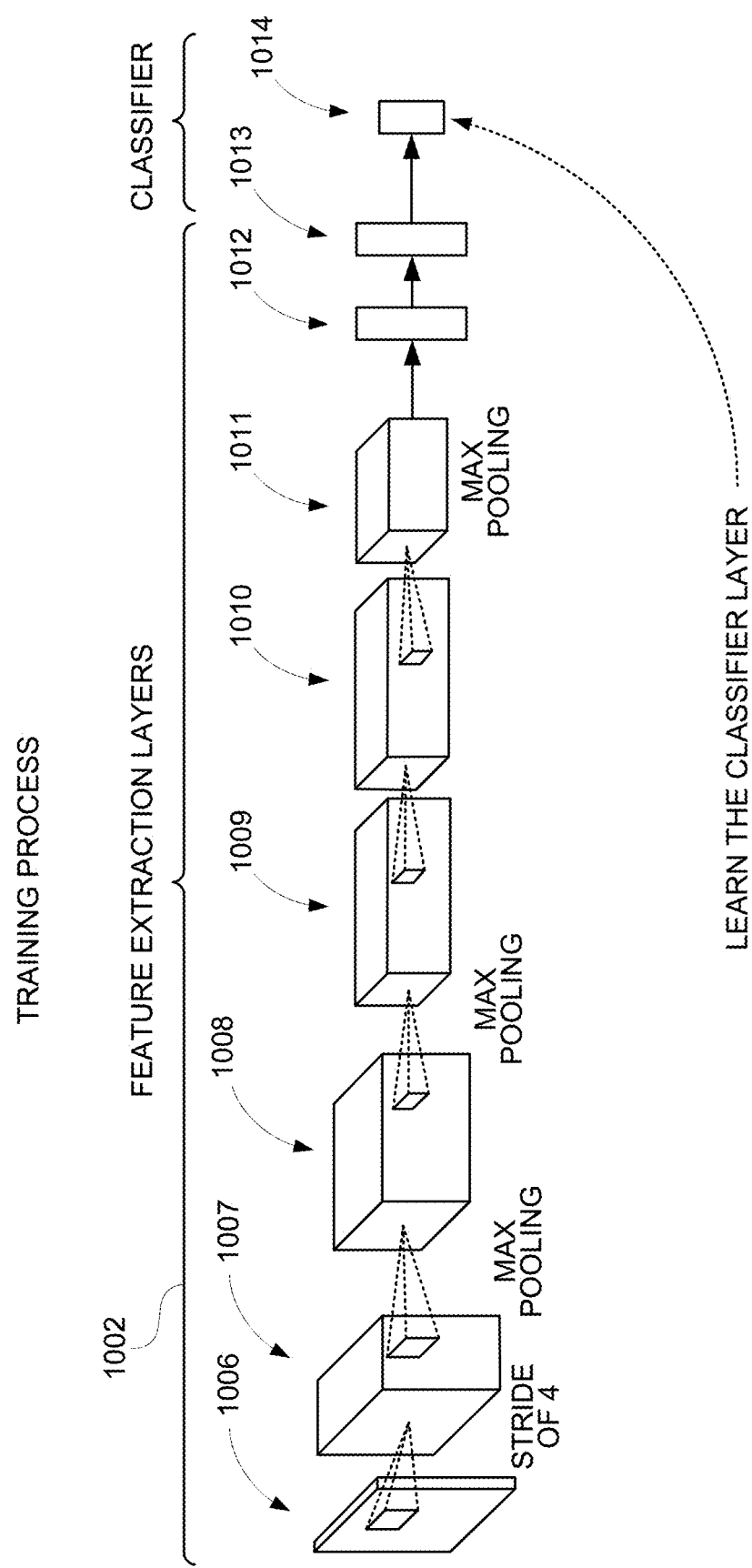
FIG. 10 illustrates the feature-extraction process and classifier training, in accordance with some embodiments.

FIG. 10 illustrates the feature-extraction process and classifier training, according to some example embodiments. Training the classifier may be divided into feature extraction layers 1002 and classifier layer 1014. Each image is analyzed in sequence by a plurality of layers 1006-1013 in the feature-extraction layers 1002. As discussed below, some embodiments of machine learning are used for facial classification (i.e., classifying a given facial image as belonging to a given person, such as Barack Obama, George W. Bush, Bill Clinton, the owner of a given mobile phone, and the like). However, as discussed herein, a facial recognition image classification neural network or a general image classification neural network (that classifies an image as including a given object, such as a table, a chair, a lamp, and the like) may be further trained to classify images of bobbins as having or lacking imperfection(s) and, for images of bobbins having imperfections, by imperfection type.

With the development of deep convolutional neural networks, the focus in face recognition has been to learn a good face feature space, in which faces of the same person are close to each other and faces of different persons are far away from each other. For example, the verification task with the LFW (Labeled Faces in the Wild) dataset has been often used for face verification.

Many face identification datasets (e.g., MegaFace and LFW) that are used for face identification tasks are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally uses a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization operations. Further, feature extraction is related to dimensionality reduction, such as reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc.

Eventually this DNN produces outputs by classifier 1014. In FIG. 10, the data travels from left to right and the features are extracted. The goal of training the neural network is to find the weights for all the layers that make them adequate for the desired task.

As shown in FIG. 10, a "stride of 4" filter is applied at layer 1006, and max pooling is applied at layers 1007-1013. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the weights are identified at the different layers for accomplishing a desired task. The challenge is that for a typical neural network, there may be millions of weights to be optimized. Trying to optimize all these weights from scratch may take hours, days, or even weeks, depending on the amount of computing resources available and the amount of data in the training set.

Figure 11:
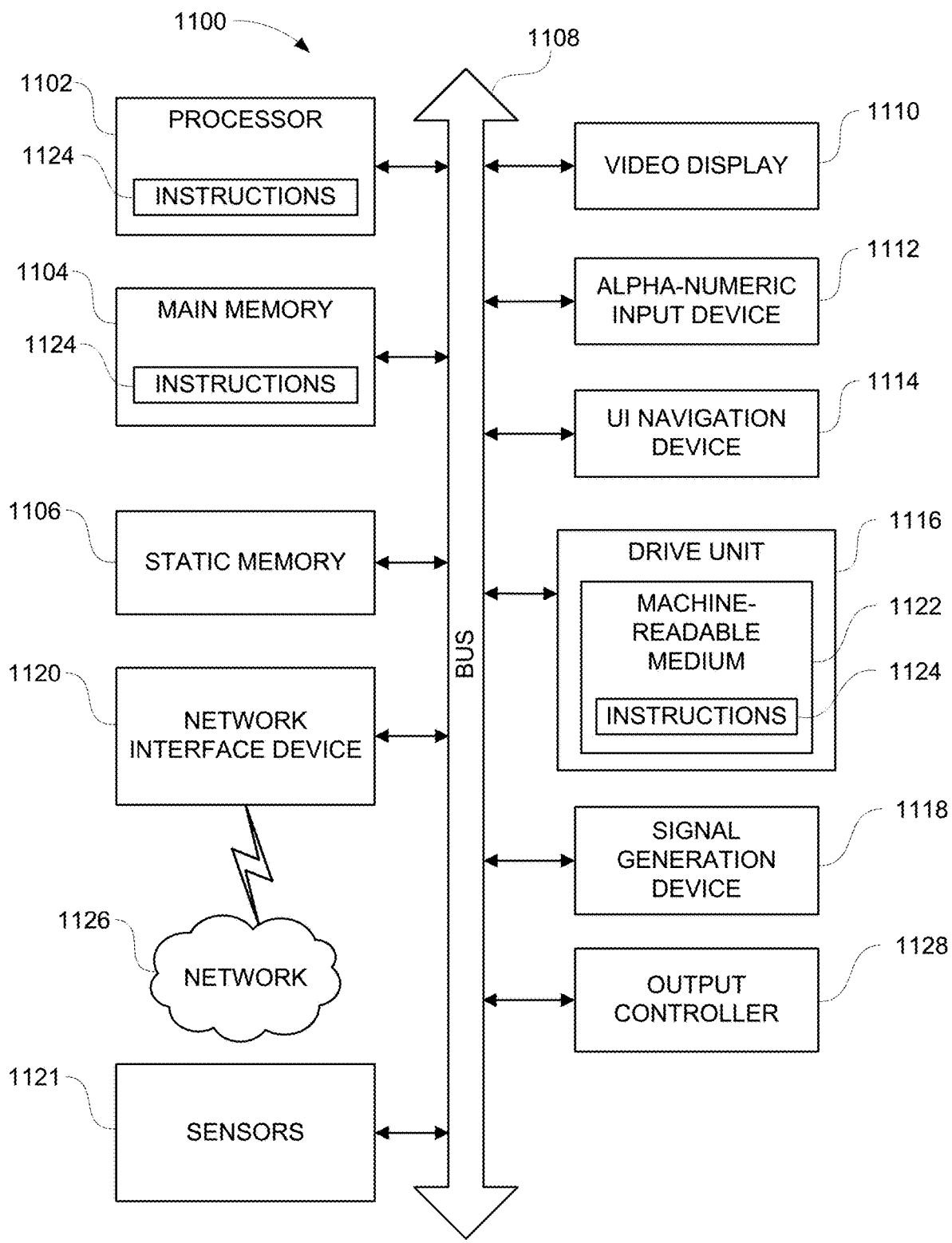
FIG. 11 is a block diagram of a computing machine, in accordance with some embodiments.

FIG. 11 illustrates a circuit block diagram of a computing machine 1100 in accordance with some embodiments. In some embodiments, components of the computing machine 1100 may store or be integrated into other components shown in the circuit block diagram of FIG. 11. For example, portions of the computing machine 1100 may reside in the processor 1102 and may be referred to as "processing circuitry." Processing circuitry may include processing hardware, for example, one or more central processing units (CPUs), one or more graphics processing units (GPUs), and the like. In alternative embodiments, the computing machine 1100 may operate as a standalone device or may be connected (e.g., networked) to other computers. In a networked deployment, the computing machine 1100 may operate in the capacity of a server, a client, or both in server-client network environments. In an example, the computing machine 1100 may act as a peer machine in peer-to-peer (P2P) (or other distributed) network environment. The computing machine 1100 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 1100 may include a hardware processor 1102 (e.g., a central processing unit (CPU), a GPU, a hardware processor core, or any combination thereof), a main memory 1104 and a static memory 1106, some or all of which may communicate with each other via an interlink (e.g., bus) 1108. Although not shown, the main memory 1104 may contain any or all of removable storage and non-removable storage, volatile memory or non-volatile memory. The computing machine 1100 may further include a video display unit 1110 (or other display unit), an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The computing machine 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The computing machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 1116 (e.g., a storage device) may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the computing machine 1100. In an example, one or any combination of the hardware processor 1102, the main memory 1104, the static memory 1106, or the storage device 1116 may constitute machine readable media.

While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the computing machine 1100 and that cause the computing machine 1100 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas to connect to the communications network 1126.

Figure 12:
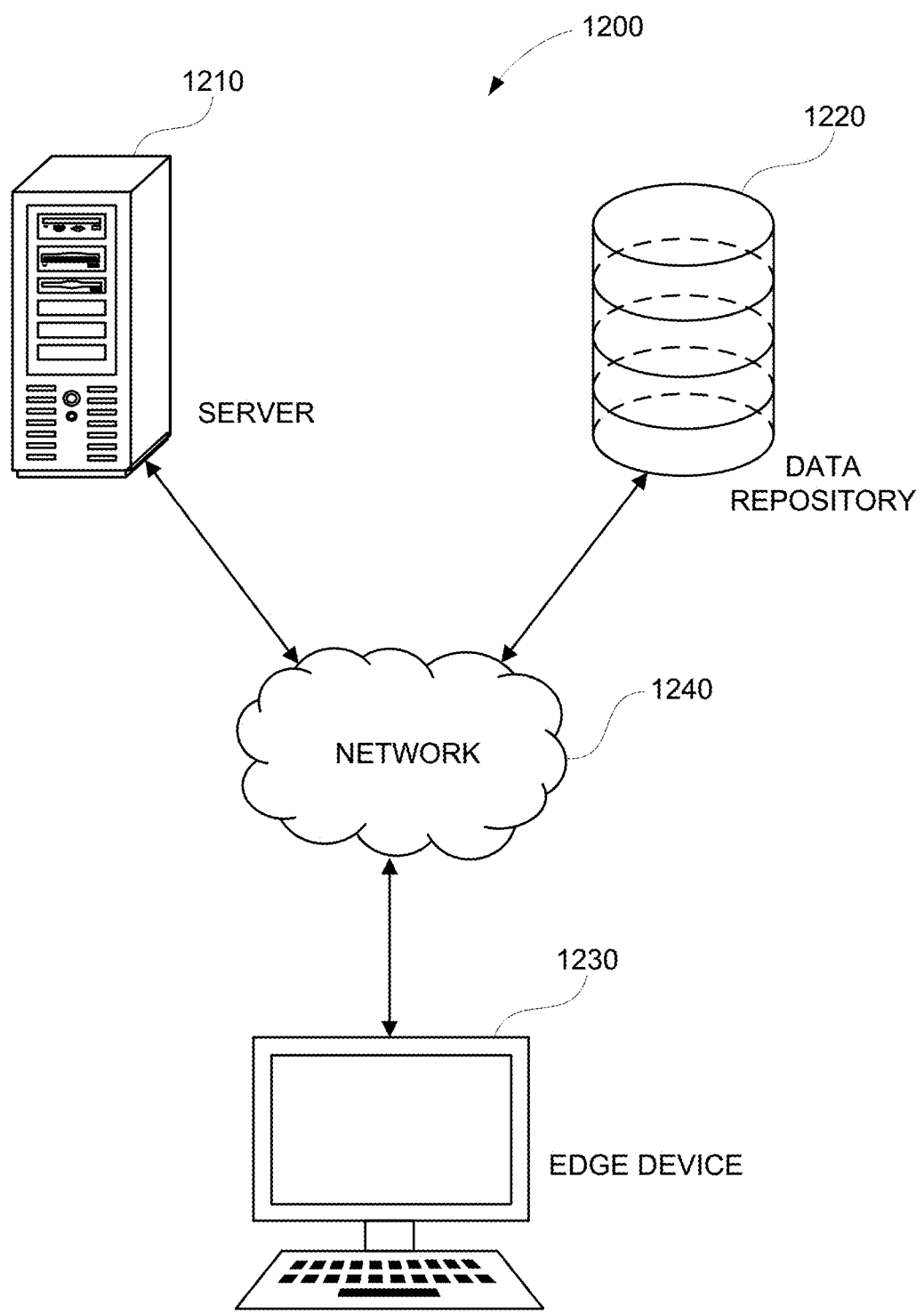
FIG. 12 illustrates an example system in which artificial intelligence-based yarn quality control may be implemented, in accordance with some embodiments.

FIG. 12 illustrates an example system 1200 in which artificial intelligence-based yarn quality control may be implemented, in accordance with some embodiments. As shown, the system 1200 includes a server 1210, a data repository 1220, and an edge device 1230. The server 1210, the data repository 1220, and the edge device 1230 communicate with one another over a network 1240. The network 1240 may include one or more of the internet, an intranet, a local area network, a wide area network, a cellular network, a WiFi® network, a virtual private network, a wired network, a wireless network, and the like. In some embodiments, a direct wired or wireless connection may be used in addition to or in place of the network 1240.

The data repository 1220 stores images of wound fiber bobbins. The images of wound fiber bobbins include camera-generated images and computer-generated images, which may be generated at the server 1210 as described herein. The edge device 1230 may be one or more of a desktop computer, a laptop computer, a tablet computer, a mobile phone, a digital music player, and a personal digital assistant (PDA). The server 1210 generates and trains an image recognition DNN model to identify whether a received image (of a wound fiber bobbin) depicts a imperfection and the imperfection type upon detecting a imperfection. The image recognition DNN model may be a CNN model or any other type of DNN model. Examples of operation of the server 1210 are discussed below in conjunction with FIG. 13.

In FIG. 12, the server 1210, the data repository 1220, and the edge device 1230 are illustrated as being separate machines. However, in some embodiments, a single machine may include two or more of the server 1210, the data repository 1220, and the edge device 1230. In some embodiments, the functions of the server 1210 may be split between two or more machines. In some embodiments, the functions of the data repository 1220 may be split between two or more machines. In some embodiments, the functions of the edge device 1230 may be split between two or more machines.

Figure 13:
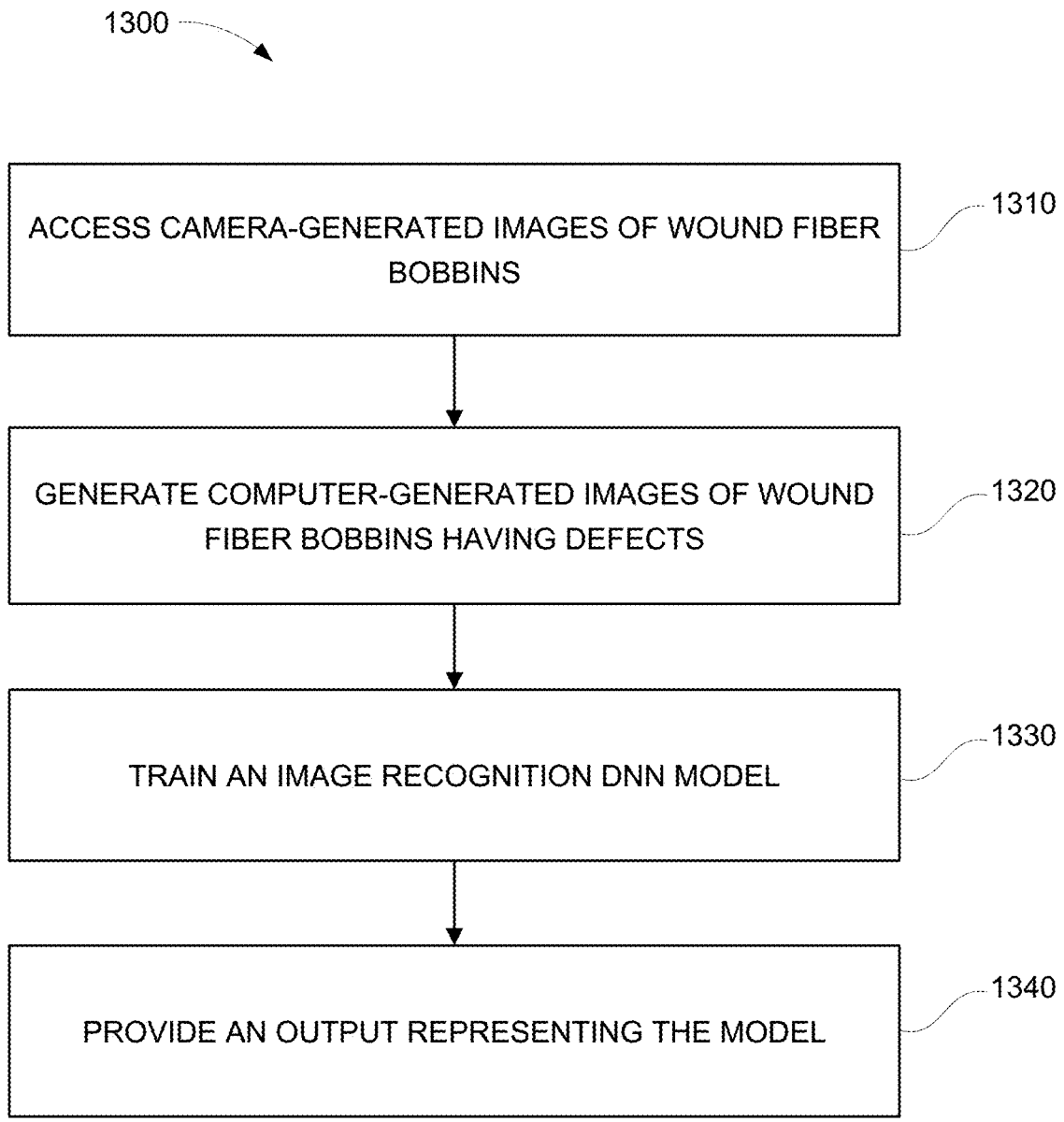
FIG. 13 illustrates an example method for artificial intelligence-based yarn quality control.

The server 1210 may store, train, and inference with a generative adversarial network (GAN), an image recognition DNN model, and a transfer learning engine, as described in conjunction with FIG. 13. The GAN and the image recognition DNN model may be implemented as an engine using software, hardware or a combination of software and hardware.

FIG. 13 illustrates an example method 1300 for artificial intelligence-based yarn quality control. The method 1300 is described below as being implemented at the server 1210 using the system 1200 of FIG. 12. However, the method 1300 may also be implemented using different configuration(s) of computing machines.

At operation 1310, the server 1210 accesses, a plurality of camera-generated images of wound fiber bobbins that are stored at the data repository 1220. The plurality of camera-generated images include a first plurality of images that are labeled as imperfection-free bobbins and a second plurality of images that are labeled as defective bobbins. At least one of the images in the second plurality of images is labeled with a imperfection type. Some examples of imperfection types, as well as hardware and/or software that may be used to identify the imperfection types, are shown in Table 1 below. The imperfection types, hardware, and software are provided as an example and do not limit the technology disclosed herein.

A wide variety of conditions can be identified using an example of the present subject matter. Examples include package formation imperfections, stains, core damage, and other various manufacturing imperfections.

At operation 1320, the server 1210 generates a plurality of computer-generated images of wound fiber bobbins having imperfections. The plurality of computer-generated images of wound fiber bobbins having imperfections are generated using a GAN and based on the plurality of camera-generated images. One or more of the computer-generated images is labeled with a imperfection type (e.g., one or more of the imperfection types in Table 1).

In a GAN, two neural networks contest with each other in a game (in the sense of game theory, often but not always in the form of a zero-sum game). Given a training set, this technique learns to generate new data with the same statistics as the training set. For example, a GAN trained on photographs can generate new photographs that look at least superficially authentic to human observers, having many realistic characteristics. Though originally proposed as a form of generative model for unsupervised learning, GANs have also proven useful for semi-supervised learning, fully supervised learning, and reinforcement learning.

In some cases, the camera-generated images include a large number of images of imperfection free bobbins and a much smaller number of images of defective bobbins. This might not be sufficient to train a model to identify defective bobbins and imperfection types. Thus, additional computer-generated images of defective bobbins may be useful. The plurality of computer-generated images of wound fiber bobbins having imperfections may include at least n times as many images as the second plurality of camera-generated images that are labeled as defective bobbins, where n may be two, three, ten, etc.

At operation 1330, the server 1210 further trains, using a transfer learning engine and using a training dataset comprising the plurality of camera-generated images and the plurality of computer-generated images, a previously-trained image recognition DNN model to identify whether a received image depicts a imperfection and the imperfection type upon detecting a imperfection. Prior to the further training using the transfer learning engine (in operation 1330), the model was previously trained to recognize images that are different from wound fiber bobbins. For example, prior to the further training using the transfer learning engine (in operation 1330), the model might correspond to the facial recognition model described in conjunction with FIG. 9.

In some examples, the model comprises an input layer, an output layer, and a plurality of hidden layers. The transfer learning engine adjusts at least the input layer and the output layer prior to the further training (of operation 1330). The further training (of operation 1330) modifies weights applied in the plurality of hidden layers.

Transfer learning is a subfield of machine learning that focuses on storing knowledge gained while solving one problem (e.g., facial classification or image classification) and applying it to a different but related problem (e.g., wound fiber bobbin imperfection classification). From the practical standpoint, reusing or transferring information from previously learned tasks for the learning of new tasks has the potential to significantly improve the sample efficiency of a reinforcement learning agent.

At operation 1340, the server 1210 provides an output representing the model. The model may be provided (e.g., transmitted) to a storage unit (e.g., the data repository 1220 or a different storage unit) for storage thereat.

In some embodiments, providing the output representing the model comprises providing (e.g., transmitting) the model to the edge device 1230 for deployment of the inference phase of the model thereat. In the inference phase, the edge device 1230 receives a specimen wound fiber bobbin image. The specimen wound fiber bobbin image may be received via the network 1240, from the local memory of the edge device 1230 or via a camera (e.g., webcam or built-in camera) coupled with the edge device 1230. The edge device 1230 determines, using the deployed model, a probability that the specimen wound fiber bobbin image depicts a imperfection. The edge device 1230 provides an output associated with the probability that the specimen wound fiber bobbin image depicts the imperfection.

In some examples, the output associated with the probability may include the probability itself or a mathematical function of the probability. The output associated with the probability may include a first value (e.g., TRUE) if the probability is greater than a threshold (e.g., 50%, 70% or 90%) and a second value (e.g., FALSE) if the probability is less than the threshold.

In some examples, upon determining that the probability that the specimen wound fiber bobbin image depicts the imperfection exceeds a threshold value (e.g., 55%, 75% or 95%), the edge device 1230 determines, using the deployed image recognition DNN model, the imperfection type of the imperfection and a probability for the imperfection type. The edge device 1230 providing an output associated with the probability for the imperfection type. For example, if the probability for the imperfection type exceeds a probability threshold (e.g., 60%), the edge device 1230 may provide an output indicating the imperfection type.

NUMBERED EXAMPLES

Some aspects are described below as numbered examples (Example 1, 2, 3, etc.). These numbered examples do not limit the technology disclosed herein.

Example 1 is a method implemented at one or more computing machines, the method comprising: accessing, using a server, a plurality of camera-generated images of wound fiber bobbins that are stored in one or more data storage units, the plurality of camera-generated images comprising a first plurality of images that are labeled as imperfection-free bobbins and a second plurality of images that are labeled as defective bobbins, at least one of the images in the second subset being labeled with a imperfection type; generating, using a generative adversarial network (GAN) and based on the plurality of camera-generated images, a plurality of computer-generated images of wound fiber bobbins having imperfections, one or more of the computer-generated images being labeled with the imperfection type; further training, using a transfer learning engine and using a training dataset comprising the plurality of camera-generated images and the plurality of computer-generated images, a previously-trained image recognition deep neural network (DNN) model to identify whether a received image depicts a imperfection and the imperfection type upon detecting a imperfection, wherein, prior to the further training using the transfer learning engine, the model was previously trained to recognize images that are different from wound fiber bobbins; and providing an output representing the model.

In Example 2, the subject matter of Example 1 includes, wherein providing the output representing the model comprises providing the model to an edge device for deployment thereat, wherein the edge device comprises one or more of a desktop computer, a laptop computer, a tablet computer, a mobile phone, a digital music player, and a personal digital assistant (PDA).

In Example 3, the subject matter of Example 2 includes, receiving, at the edge device, a specimen wound fiber bobbin image; determining, using the deployed model, a probability that the specimen wound fiber bobbin image depicts a imperfection; and providing an output associated with the probability that the specimen wound fiber bobbin image depicts the imperfection.

In Example 4, the subject matter of Example 3 includes, upon determining that the probability that the specimen wound fiber bobbin image depicts the imperfection exceeds a threshold value: determining, using the deployed image recognition DNN model, the imperfection type of the imperfection and a probability for the imperfection type; and providing an output associated with the probability for the imperfection type.

In Example 5, the subject matter of Examples 3-4 includes, wherein the output associated with the probability comprises a first value if the probability is greater than a threshold and a second value if the probability is less than the threshold.

In Example 6, the subject matter of Examples 3-5 includes, wherein the output associated with the probability comprises the probability or a mathematical function of the probability.

In Example 7, the subject matter of Examples 1-6 includes, wherein the model comprises an input layer, an output layer, and a plurality of hidden layers, the method further comprising: adjusting, using the transfer learning engine, at least the input layer and the output layer prior to the further training, wherein the further training modifies weights applied in the plurality of hidden layers.

In Example 8, the subject matter of Examples 1-7 includes, wherein the plurality of computer-generated images comprise at least two times as many images as the second plurality of images.

In Example 9, the subject matter of Examples 1-8 includes, wherein the image recognition DNN comprises a convolutional neural network (CNN).

In Example 10, the subject matter of Examples 1-9 includes, wherein providing the output representing the model comprises providing the model to a storage unit for storage thereat.

Example 11 is a machine-readable medium storing instructions which, when executed at one or more computing machines, cause the one or more computing machines to perform operations comprising: accessing, using a server, a plurality of camera-generated images of wound fiber bobbins that are stored in one or more data storage units, the plurality of camera-generated images comprising a first plurality of images that are labeled as imperfection-free bobbins and a second plurality of images that are labeled as defective bobbins, at least one of the images in the second subset being labeled with a imperfection type; generating, using a generative adversarial network (GAN) and based on the plurality of camera-generated images, a plurality of computer-generated images of wound fiber bobbins having imperfections, one or more of the computer-generated images being labeled with the imperfection type; further training, using a transfer learning engine and using a training dataset comprising the plurality of camera-generated images and the plurality of computer-generated images, a previously-trained image recognition deep neural network (DNN) model to identify whether a received image depicts a imperfection and the imperfection type upon detecting a imperfection, wherein, prior to the further training using the transfer learning engine, the model was previously trained to recognize images that are different from wound fiber bobbins; and providing an output representing the model.

In Example 12, the subject matter of Example 11 includes, wherein providing the output representing the model comprises providing the model to an edge device for deployment thereat, wherein the edge device comprises one or more of a desktop computer, a laptop computer, a tablet computer, a mobile phone, a digital music player, and a personal digital assistant (PDA).

In Example 13, the subject matter of Example 12 includes, the operations further comprising: receiving, at the edge device, a specimen wound fiber bobbin image; determining, using the deployed model, a probability that the specimen wound fiber bobbin image depicts a imperfection; and providing an output associated with the probability that the specimen wound fiber bobbin image depicts the imperfection.

In Example 14, the subject matter of Example 13 includes, the operations further comprising: upon determining that the probability that the specimen wound fiber bobbin image depicts the imperfection exceeds a threshold value: determining, using the deployed image recognition DNN model, the imperfection type of the imperfection and a probability for the imperfection type; and providing an output associated with the probability for the imperfection type.

In Example 15, the subject matter of Examples 13-14 includes, wherein the output associated with the probability comprises a first value if the probability is greater than a threshold and a second value if the probability is less than the threshold.

In Example 16, the subject matter of Examples 13-15 includes, wherein the output associated with the probability comprises the probability or a mathematical function of the probability.

In Example 17, the subject matter of Examples 11-16 includes, wherein the model comprises an input layer, an output layer, and a plurality of hidden layers, the operations further comprising: adjusting, using the transfer learning engine, at least the input layer and the output layer prior to the further training, wherein the further training modifies weights applied in the plurality of hidden layers.

Example 18 is a system comprising: processing circuitry; and a memory storing instructions which, when executed at the processing circuitry, cause the processing circuitry to perform operations comprising: accessing, using a server, a plurality of camera-generated images of wound fiber bobbins that are stored in one or more data storage units, the plurality of camera-generated images comprising a first plurality of images that are labeled as imperfection-free bobbins and a second plurality of images that are labeled as defective bobbins, at least one of the images in the second subset being labeled with a imperfection type; generating, using a generative adversarial network (GAN) and based on the plurality of camera-generated images, a plurality of computer-generated images of wound fiber bobbins having imperfections, one or more of the computer-generated images being labeled with the imperfection type; further training, using a transfer learning engine and using a training dataset comprising the plurality of camera-generated images and the plurality of computer-generated images, a previously-trained image recognition deep neural network (DNN) model to identify whether a received image depicts a imperfection and the imperfection type upon detecting a imperfection, wherein, prior to the further training using the transfer learning engine, the model was previously trained to recognize images that are different from wound fiber bobbins; and providing an output representing the model.

In Example 19, the subject matter of Example 18 includes, wherein providing the output representing the model comprises providing the model to an edge device for deployment thereat, wherein the edge device comprises one or more of a desktop computer, a laptop computer, a tablet computer, a mobile phone, a digital music player, and a personal digital assistant (PDA).

In Example 20, the subject matter of Example 19 includes, the operations further comprising: receiving, at the edge device, a specimen wound fiber bobbin image; determining, using the deployed model, a probability that the specimen wound fiber bobbin image depicts a imperfection; and providing an output associated with the probability that the specimen wound fiber bobbin image depicts the imperfection.

Example 21 is a textile package production system comprising: an imager configured to generate an optical image for a textile package, the imager having at least one optical detector and an optical emitter, the imager having an inspection region; a transporter having a test subject carrier configured for relative movement as to the carrier and the inspection region; a sorter coupled to the transporter and configured to make a selection as to a first classification and a second classification; and a controller having a processor and a memory, the controller coupled to the imager, the transporter, and the sorter and configured to implement an artificial engine classifier in which the sorter is controlled based on the optical image and based on instructions and training data in the memory.

In Example 22, the subject matter of Example 21 includes, wherein the controller is configured to implement a neural network.

In Example 23, the subject matter of Examples 21-22 includes, wherein the controller is configured to implement a regression calculation.

In Example 24, the subject matter of Examples 21-23 includes, wherein the imager is configured to generate a two-dimensional view.

In Example 25, the subject matter of Examples 21-24 includes, wherein the controller is configured to generate a bounding box in the two-dimensional view.

In Example 26, the subject matter of Example 25 includes, wherein the controller is configured to generate a prediction corresponding to the bounding box.

In Example 27, the subject matter of Examples 21-26 includes, wherein the at least one optical detector includes a camera.

Example 28 is at least one machine-readable medium including instructions that, when executed by processing circuitry, cause the processing circuitry to perform operations to implement of any of Examples 1-27.

Example 29 is an apparatus comprising means to implement of any of Examples 1-27.

Example 30 is a system to implement of any of Examples 1-27.

Example 31 is a method to implement of any of Examples 1-27.

Various Notes

One example includes a method for teaching and operating. Teaching can include training artificial intelligence to distinguish between any number of conditions. One example includes distinguishing between acceptable and unacceptable quality. Teaching can include optically scanning thread containers to provide a library of scanned thread container images. The images can be sorted into at least two categories. In addition, further images can be scanned. Furthermore, the artificial intelligence algorithm can be fitted with further refinements. This can include learning based on anomalies in the image that indicate presence of imperfections. The method can include operating the artificial intelligence system to sort images in a production mode. This can include online access to images for evaluation or online access to training data. The scanned images can be used to generate or to augment the training data for the artificial intelligence system. The trained system can be configured to identify imperfections in bobbins.

An example of the present subject matter includes specialized hardware and a specifically programmed computer. The hardware can include imaging equipment, such as optical lenses and filters, to image fine details in a bobbin. Imperfections can be particularly challenging to discern in view of the wide variety of bobbin appearances and the very small dimensions of the wound filaments. Adequate lighting and sensitive optical systems, in conjunction with specifically programmed processor to implement the methods described herein can aid in grading quality of manufactured items, such as bobbins. It is the combination of elements disclosed herein which can solve the problem of evaluating yarn quality in a bobbin-handling facility.

The method can also include providing a quality standard and sorting. Providing the quality standard can facilitate sorting by specific imperfections. In addition, the sorting can include classifying the fiber container into classes based on the type of imperfection, the nature or severity of the imperfection, or the number of imperfections. Sorting can include physically segregating bobbins or sorting can include storing data in a memory associated with quality or characteristics of each bobbins or it can include classifying each bobbin into a number of categories. In one example of the present subject matter, physical sorting is omitted and quality data for each bobbin is stored in a memory.

In one example, the method can also include associating at least one specific imperfection with an independent variable in a fiber manufacturing process. In addition, the method can include adjusting the independent variable to decrease the incidence of the specific imperfection.

In one example, the method includes detecting a imperfection characterized by nonuniform distribution of fiber in adjacent rows and layers, and wherein the independent variable adjusted is the fiber package build quality.

In one example, the fiber package build quality is adjusted by modifying the mechanical condition of a fiber or a fiber winding apparatus.

In one example, the method includes evaluating the artificial intelligence sorting system and updating the artificial intelligence algorithm.

A device suitable for sorting thread containers can include a camera, a light, a lens, a controller, a computer configured to store images and execute an artificial intelligence algorithm, and a mechanical sorting device for sorting fiber containers based on executing of the algorithm. One example includes an edge server, or a server located in a cloud environment. A processor positioned near the packing line can be used for evaluation and storage and training of the model can be performed in the cloud.

One example of the present subject matter implements an algorithm known as YOLO. Unlike object detection, YOLO implements a classifier in a manner to also perform detection. In YOLO, object detection can be viewed as a regression problem using separated bounding boxes and associated class probabilities. A single neural network predicts bounding boxes and class probabilities directly from full images in a single pass of an image. YOLO creates boxes around elements in an image and determines identity of the contents in each box.

In addition to regression analysis, such as that exemplified by YOLO, one example of the present subject matter includes a probabilistic model. As such, the calculation utilizes random values and probability distributions to model bobbin production outcomes.

One example of an algorithm includes deformable parts models and uses sliding filters or region-based classifiers.

One example performs image recognition using an entire image of a package.

One example is configured to detect multiple imperfections. The imperfections can occur in any location on a package. For example, package formation imperfections can be detected. One example can detect yarn ends. One example can measure physical dimensions of yarn and bobbin.

Quality parameters can be correlated with measurement parameters. A threshold for measurement parameters can be algorithmically set or can be set by a user.

One example of the present subject matter can detect imperfections after manufacturing or during manufacturing.

In one example, the test subject, and the training data depict the whole bobbin (including the face).

One example includes evaluating (classifying) using computer vision and machine learning. Unlike simply comparing with a baseline, the present subject matter can learn with continued analysis and classification of test subjects.

For example, one embodiment includes an algorithm configured to learn various winding patterns (multiple patterns).

The training data can be provided to the controller by stored data in memory, by user-provided example, or by accessing online resources.

One example of the present subject matter includes an optical inspection in conjunction with artificial intelligence and computer control in the context of yarn package quality control and sorting.

One example includes yarn package imperfection detection and control. The subject matter disclosed herein can be configured for textile-related processes which use equipment and methodology like that described herein (camera image acquisition and scanning, image database, AI processing of imperfections in relation to standard images, and sorting based on the AI processing).

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to an example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method implemented at one or more computing machines, the method comprising:
   accessing, using a server, a plurality of camera-generated images of wound fiber bobbins that are stored in one or more data storage units, the plurality of camera-generated images comprising a first plurality of images that are labeled as imperfection-free bobbins and a second plurality of images that are labeled as defective bobbins, at least one of the images in the second plurality of images being labeled with an imperfection type;
   generating, using a generative adversarial network (GAN) and based on the plurality of camera-generated images, a plurality of computer-generated images of wound fiber bobbins having imperfections, one or more of the computer-generated images being labeled with the imperfection type;
   further training, using a transfer learning engine and using a training dataset comprising the plurality of camera-generated images and the plurality of computer-generated images, a previously-trained image recognition deep neural network (DNN) model to identify whether a received image depicts an imperfection and the imperfection type upon detecting the imperfection, wherein, prior to the further training using the transfer learning engine, the model was previously trained to recognize images that are different from wound fiber bobbins; and
   providing an output representing the model.

2. The method of claim 1, wherein providing the output representing the model comprises providing the model to an edge device for deployment thereat, wherein the edge device comprises one or more of a desktop computer, a laptop computer, a tablet computer, a mobile phone, a digital music player, and a personal digital assistant (PDA).

3. The method of claim 2, further comprising:
receiving, at the edge device, a specimen wound fiber bobbin image;
determining, using the deployed model, a probability that the specimen wound fiber bobbin image depicts an imperfection; and
providing an output associated with the probability that the specimen wound fiber bobbin image depicts the imperfection.

4. The method of claim 3, further comprising:
upon determining that the probability that the specimen wound fiber bobbin image depicts the imperfection exceeds a threshold value:
determining, using the deployed image recognition DNN model, the imperfection type of the imperfection and a probability for the imperfection type; and
providing an output associated with the probability for the imperfection type.

5. The method of claim 3, wherein the output associated with the probability comprises a first value if the probability is greater than a threshold and a second value if the probability is less than the threshold.

6. The method of claim 3, wherein the output associated with the probability comprises the probability or a mathematical function of the probability.

7. The method of claim 1, wherein the model comprises an input layer, an output layer, and a plurality of hidden layers, the method further comprising:
adjusting, using the transfer learning engine, at least the input layer and the output layer prior to the further training, wherein the further training modifies weights applied in the plurality of hidden layers.

8. The method of claim 1, wherein the plurality of computer-generated images comprise at least two times as many images as the second plurality of images.

9. The method of claim 1, wherein the image recognition DNN comprises a convolutional neural network (CNN).

10. The method of claim 1, wherein providing the output representing the model comprises providing the model to a storage unit for storage thereat.

11. A non-transitory machine-readable medium storing instructions which, when executed at one or more computing machines, cause the one or more computing machines to perform operations comprising:
accessing, using a server, a plurality of camera-generated images of wound fiber bobbins that are stored in one or more data storage units, the plurality of camera-generated images comprising a first plurality of images that are labeled as imperfection-free bobbins and a second plurality of images that are labeled as defective bobbins, at least one of the images in the second plurality of images being labeled with an imperfection type;
generating, using a generative adversarial network (GAN) and based on the plurality of camera-generated images, a plurality of computer-generated images of wound fiber bobbins having imperfections, one or more of the computer-generated images being labeled with the imperfection type;
further training, using a transfer learning engine and using a training dataset comprising the plurality of camera-generated images and the plurality of computer-generated images, a previously-trained image recognition deep neural network (DNN) model to identify whether a received image depicts an imperfection and the imperfection type upon detecting the imperfection, wherein, prior to the further training using the transfer learning engine, the model was previously trained to recognize images that are different from wound fiber bobbins; and
providing an output representing the model.

12. The machine-readable medium of claim 11, wherein providing the output representing the model comprises providing the model to an edge device for deployment thereat, wherein the edge device comprises one or more of a desktop computer, a laptop computer, a tablet computer, a mobile phone, a digital music player, and a personal digital assistant (PDA).

13. The machine-readable medium of claim 12, the operations further comprising:
receiving, at the edge device, a specimen wound fiber bobbin image;
determining, using the deployed model, a probability that the specimen wound fiber bobbin image depicts the imperfection; and
providing an output associated with the probability that the specimen wound fiber bobbin image depicts the imperfection.

14. The machine-readable medium of claim 13, the operations further comprising:
upon determining that the probability that the specimen wound fiber bobbin image depicts the imperfection exceeds a threshold value:
determining, using the deployed image recognition DNN model, the imperfection type of the imperfection and a probability for the imperfection type; and
providing an output associated with the probability for the imperfection type.

15. The machine-readable medium of claim 13, wherein the output associated with the probability comprises a first value if the probability is greater than a threshold and a second value if the probability is less than the threshold.

16. The machine-readable medium of claim 13, wherein the output associated with the probability comprises the probability or a mathematical function of the probability.

17. The machine-readable medium of claim 11, wherein the model comprises an input layer, an output layer, and a plurality of hidden layers, the operations further comprising:
adjusting, using the transfer learning engine, at least the input layer and the output layer prior to the further training, wherein the further training modifies weights applied in the plurality of hidden layers.

18. A system comprising:
processing circuitry; and
a memory storing instructions which, when executed at the processing circuitry, cause the processing circuitry to perform operations comprising:
accessing, using a server, a plurality of camera-generated images of wound fiber bobbins that are stored in one or more data storage units, the plurality of camera-generated images comprising a first plurality of images that are labeled as imperfection-free bobbins and a second plurality of images that are labeled as defective bobbins, at least one of the images in the second plurality of images being labeled with an imperfection type;
generating, using a generative adversarial network (GAN) and based on the plurality of camera-generated images, a plurality of computer-generated images of wound fiber bobbins having imperfections, one or more of the computer-generated images being labeled with the imperfection type;

further training, using a transfer learning engine and using a training dataset comprising the plurality of camera-generated images and the plurality of computer-generated images, a previously-trained image recognition deep neural network (DNN) model to identify whether a received image depicts an imperfection and the imperfection type upon detecting the imperfection, wherein, prior to the further training using the transfer learning engine, the model was previously trained to recognize images that are different from wound fiber bobbins; and providing an output representing the model.

19. The system of claim 18, wherein providing the output representing the model comprises providing the model to an edge device for deployment threat, wherein the edge device comprises one or more of a desktop computer, a laptop computer, a tablet computer, a mobile phone, a digital music player, and a personal digital assistant (PDA).

20. The system of claim 19, the operations further comprising:

receiving, at the edge device, a specimen wound fiber bobbin image;

determining, using the deployed model, a probability that the specimen wound fiber bobbin image depicts the imperfection; and providing an output associated with the probability that the specimen wound fiber bobbin image depicts the imperfection.

* * * * *